United States Patent Office 3,210,386
Patented Oct. 5, 1965

3,210,386
3-AMINOETHERS OF 3β-HYDROXY ANDROSTANES
Robert D. Birkenmeyer, Fred Kagan, Daniel Lednicer, and Barney J. Magerlein, Kalamazoo, Mich., assignors to The Upjohn Company, Kalamazoo, Mich., a corporation of Delaware
No Drawing. Filed Jan. 9, 1961, Ser. No. 81,270
7 Claims. (Cl. 260—397.3)

This invention relates to new steroid compounds and is particularly concerned with 3-aminoethers and 3-aminothioethers of 3β-hydroxy steroids of the androstane series having the formulae:

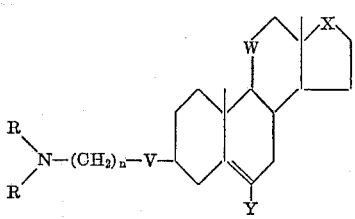

and

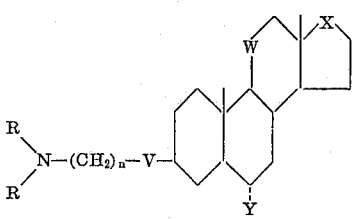

wherein $n$ has a value of 2 to 6, inclusive, wherein

is selected from the group consisting of

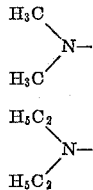

and

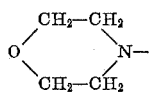

wherein V is selected from the group consisting of the elements oxygen and sulfur; and wherein Y is selected from the group consisting of methyl and hydrogen.

Furthermore, in the above formulae when V is oxygen W is selected from the group consisting of

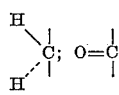

and

When V is, however, sulfur then W is selected from the group consisting of

and

In the above formulae the parameter X is selected from the group consisting of

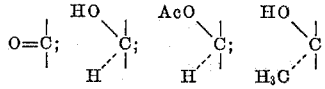

and

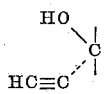

providing W is

or

and V is oxygen.

Paramater X signifies also

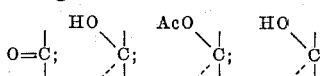

and

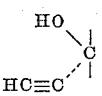

when V is sulfur and W is

or

When W is

and V is oxygen, however, then X is selected from the group consisting of

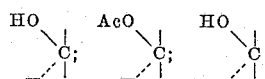

and

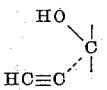

The term Ac in the above parameters refers to the acyl radical of a hydrocarbon carboxylic acid containing from one to eight carbon atoms, inclusive.

Furthermore, the invention relates to the N-oxides of the above defined products and the acid mineral salts of the above defined products, particularly the hydrochlorides and sulfates.

Additionally, the invention is concerned with the process of production for the above compounds.

The process of production of the compound of the structure shown above essentially comprises: conversion of a selected 3-hydroxy-17-keto-androstane or 3-hydroxy-17-keto-androstene to the 3-aminoether thereof with a selected amino-alkyl chloride by generally known procedures. Depending on the procedure chosen, it may be necessary to protect the 17-keto group of the starting compound of the androstane series, for example, by ketalization. In the event that it is desired to have a 11-keto steroid ether as a final product, it will often be necessary to use a starting 3-hydroxy-17-keto steroid with an 11-oxy group and to oxidize this material to the corresponding 11-keto product after the ether linkage has been established.

To obtain 3-thioether, the same processes are carried out with a compound selected from the 3-mercapto-androstane series.

The amino ether, obtained in the form of a salt, can be converted to the free basic amino ether by treatment with a base, and can be, if desired, converted to the salts of other acids by treating the free amino ether base with such acids. Additional reactions after etherification include:

(1) Catalytic hydrogenation to convert $\Delta^5$-androstene 3-ethers to the corresponding saturated androstane 3-ether.
(2) Conversion of 17β-hydroxyl group to a 17β-acyloxy group by esterification.
(3) Conversion of the 17-keto group with a Grignard to the 17β-hydroxy-17α-alkyl or ethynyl group.
(4) Conversion of the free tertiary amino steroid ether to its N-oxide.

The compounds produced by these reactions have hypocholesteremic activity. The compounds are thus useful in the treatment of atherosclerosis which is a form of arteriosclerosis which is characterized by the fatty degeneration occurring in the arterial walls, by mechanisms not yet definitely established. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack upon the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating the excretion of cholesterol from the body. Major emphasis, however, has been placed on the search for compounds which will interfere with the production of endogenous cholesterol by the liver and hence offer a more positive means of control of cholesterol levels.

The novel compounds of the present application significantly reduce the cholesterol content of both blood and tissue by partially arresting the biosynthesis of cholesterol in the body.

The new compounds, especially in their hydrochloric acid salt form, are also active against parasite-produced diseases in animals. They are particularly active against species of Trypanosoma, such as *Trypanosoma equiperdum* and Trichomonas such as *Trichomonas vaginalis*, *Entamoeba histolytica*, *Entamoeba coli* and against many of the eggs and larvae of common animal parasites. The novel materials, therefore, can be used against *Trichomonas vaginalis*, incorporated into suppositories or bougies or, can be used in sprays and as powders, in animal bedding, for cattle or poultry in order to prevent parasitic diseases.

Starting materials for this application, are materials such as dehydroepiandrosterone, dehydroepiandrosterone mercaptan [Bernstein, J. Org. Chem. 16, 679 (1951)], 3β-hydroxy-6-methyl-17-keto-5-androstene [Greenville et al., J. Chem. Soc. (London), 4105 (1957)] and 11β-hydroxy derivatives of the before-mentioned compounds prepared by methods shown in the preparations.

In carrying out the process of the present invention, the selected starting materials, 3-hydroxy-17-keto steroids, are dissolved in an organic solvent, and reacted with the selected di-N-substituted aminoalkyl chloride. The reaction is carried out in the presence of an alkali metal metathetically reactive reagent, such as triphenylmethyl sodium or triphenylmethyl potassium, metal hydrides such as sodium or potassium hydride or an alkyl alkali metal compound such as propyl or butyl lithium or propyl or butyl sodium, providing that in this event the 17-keto group must be protected by a keto-protecting group such as ketal- or semicarbazone formation.

The amount of the di-N-substituted amino alkyl chloride used in this reaction is preferably in excess of one mole (5–50%) per mole of steroid. The base alkali metal metathetically acting reagent is used in a ratio of 1.1 moles of base per mole of steroid. These quantities, however, are not critical and larger amounts can be used.

The ketal derivative which is used in the preferred embodiment of this reaction is usually produced by reacting the 17-keto steroid with glycols, wherein the total number of carbon atoms is up to 8, inclusive, and wherein the hydroxyl groups are on carbon atoms separated at the most by one methylene group.

The reaction mixture for the etherification is usually kept at reflux temperature, that is depending on the solvent between 60 and 120° C., and the period of reflux is usually about 2 to 24 hours. After the reaction is terminated, the product is recovered by conventional methods, that is by extraction, recrystallization or chromatography with organic solvents. Since the tertiary amino compound is easily converted to its hydrochloride, in which form it is water-soluble, it is usually extracted from the reaction mixture with aqueous hydrochloric acid. Ether can be added to the reaction mixture for better results in the extraction. Since the free amino base is found to be usually a viscous oil rather than crystalline material, the product is generally used in the form of its hydrochloric acid or sulfuric acid salts. Further chemical conversions of the thus-obtained amino-ethers are disclosed in the examples.

PREPARATION 1

*3β-(2diethylaminoethoxy)-5-androsten-17-one*

A 5 percent molar excess of sodium triphenylmethyl was added to a solution of 10 grams of dehydroepiandrosterone, dissolved in 100 milliliters of benzene. A solution of 5.2 grams of diethylaminoethyl chloride, dissolved in 10.5 milliliters of toluene, was added to the reaction mixture which was then stirred at about 25° for one hour and heated at reflux temperature for two hours. The reaction mixture was filtered, the precipitate collected and suspended in about 200 milliliters of tetrahydrofuran. Five grams of diethylaminoethyl chloride, dissolved in 10 milliliters of toluene, was added and this mixture heated at reflux temperature for three hours. The reaction mixture was concentrated under vacuum and the residue dissolved in a mixture of benzene and water. The organic layer was washed three times with water, dried and concentrated under vacuum. The residue was dissolved in ether and gaseous hydrochloric acid bubbled into the solution. The precipitate which formed was collected, dried, dissolved in water, made alkaline and steam distilled. The residue was extracted with ether, dried and concentrated. The residual material was dissolved in ether and the ether solution extracted twice with dilute hydrochloric acid. The combined aqueous phases were neutralized with sodium hydroxide and extracted with methylene dichloride. The methylene dichloride extracts were concentrated under vacuum to yield 3.5 grams of a dark oil. One gram of this crude material was dissolved in methylene dichloride, placed on 100 grams of Florisil anhydrous magnesium silicate and eluted gradiently [Skellysolve B hexanes 100 percent to Skellysolve B hexanes 80 percent and 20 percent acetone at fraction 17, inclusive] collecting 200 milliliter fractions. Fractions 9 through 17, inclusive, were combined, dissolved in ether and ethereal hydrochloric acid added. The resulting precipitate was collected and recrystallized once from ethyl acetate and once from methanol-ether to a melting point of 194–197° and a rotation $[\alpha]_D^{23}$ of plus 17° in methanol.

Analysis—Calcd. for $C_{25}H_{42}ClNO_2$: C, 70.80; H, 9.98; N, 3.30. Found: C, 70.63; H, 10.21; N, 3.49

PREPARATION 2

3β-(2-diethylaminoethoxy)-5-androsten-17-one

A mixture of 100 grams of dehydroepiandrosterone, 100 milliliters of ethylene glycol, 1500 milliliters of benzene and 2 grams of para-toluenesulfonic acid were heated under reflux for a period of five hours while removing water from the condensate with a trap. The reaction mixture was thereupon cooled to 30 degrees, washed with 200 milliliters of 5 percent potassium bicarbonate solution, dried over sodium sulfate and finally 200 milliliters of benzene was distilled to complete the drying process. To the residue there was added 0.37 mole of butyl lithium, dissolved in hexane, followed by 0.38 mole of diethylaminoethyl chloride, dissolved in toluene. The reaction mixture was heated under reflux for 23 hours. The mixture was then cooled, diluted with 1 liter of ether and extracted with three successive 800 milliliter portions of dilute hydrochloric acid (80 milliliters of concentrated hydrochloric acid diluted with water to 800 milliliters). The aqueous extract was washed with 800 milliliters of ether. The combined organic extracts were dried and evaporated to yield 35 grams of recovered dehydroepiandrosterone.

The aqueous solution was extracted with 800 milliliter, 400 milliliter, and again 400 milliliter portions of methylene dichloride. These combined extracts were dried and concentrated. The residue was dissolved in a minimum of methylene dichloride and added to 2 liters of ether. The precipitate was collected by filtration, washed with ether and dried. 79 grams (53.8 percent yield) of 3β(2-diethylaminoethoxy)-5-androsten-17-one was obtained.

PREPARATION 3

3β-hydroxy-6-methyl-5-androsten-17-one

To a solution of 3.5 grams of 3β-hydroxy-6-methyl-5-androsten-17-one 3-acetate [J. Chem. Soc.(London) 4105 (1957)] in 30 milliliters of ethanol was added a solution of 80 milligrams of potassium hydroxide in two milliliters of water. The mixture was allowed to stand for a period of four hours under occasional shaking and was then poured into 150 milliliters of water. The solution was neutralized with dilute hydrochloric acid and the precipitate which was thus obtained was removed by filtration and washed with water. The material was twice recrystallized from methanol to get pure 3β-hydroxy-6-methyl-5-androsten-17-one.

PREPARATION 4

3β-mercapto-6-methyl-5-androsten-17-one

A mixture of 2 grams of 3β-hydroxy-6-methyl-5-androsten-17-one, 5 milliliters of pyridine and 5 milliliters of paratoluenesulfonyl chloride was allowed to stand at room temperature for a period of four hours. Thereafter the mixture was poured into 100 milliliters of water and this mixture was allowed to stand overnight in a refrigerator. The mixture was then filtered and the product recrystallized from methanol two times to give 3β-p-toluenesulfonate of 3β-hydroxy-6-methyl-5-androsten-17-one.

1.5 grams of 3β-hydroxy-6-methyl-5-androsten-17-one 3-p-toluenesulfonate, 3 grams of thiourea, 1.8 milliliters of pyridine and 18 milliliters of ethanol were refluxed on a steam bath for four hours. The mixture was diluted with water and left in a refrigerator for 20 hours at a temperature of about 5 degrees centigrade. The thus precipitated crystals were collected, washed with 25 percent alcohol and 75 percent water solution and thereupon recrystallized three times from methanol and acetone to give 3-isothiuronium p-toluenesulfonate of 3β-hydroxy-6-methyl-5-androsten-17-one of formula:

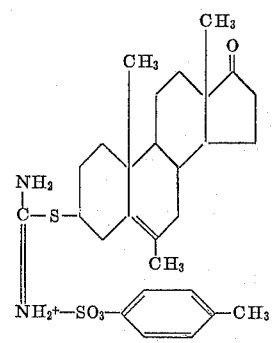

600 milligrams of the 3-(isothiuronium para-toluenesulfonate) of 3β-hydroxy-6-methyl-5-androsten-17-one was refluxed with a solution of 0.15 gram of sodium hydroxide in 15 milliliters of ethanol. To this mixture 1.2 milliliters of water were added and the mixture was refluxed for additionally 2 hours on a water-bath and thereafter poured into ice water. The mixture was acidified with glacial acetic acid whereupon a finally divided precipitate separated. The precipitate was collected, washed with water and recrystallized from benzene petroleum ether mixture to give pure 3β-mercapto-6-methyl-5-androsten-17-one.

PREPARATION 5

3β,11β-dihydroxy-5-androsten-17-one

A medium was prepared containing per liter 20 grams of dextrose and 20 grams of corn steep liquor containing 12 grams of solid material. This medium was adjusted to a pH of 6.5 by the addition of sodium hydroxide and then sterilized. To 12 liters of such sterilized medium was added vegetative mycelium growth of Cunninghamella blakesleeana ATCC 9245, previously cultivated from spores. This medium was then incubated for 48 hours at 24 degrees centigrade. Thereupon was added 12 grams of 3β-hydroxy-5-androsten-17-one and the incubation continued at 26 degrees centigrade, under stirring and aeration for a period of 48 hours. Thereupon the fermentation mixture was filtered. The resulting cake was extracted with three four-liter portions of acetone which were added to the aqueous beer and the volume of the beer was reduced to one half, at 50 degrees centigrade under reduced pressure. To this mixture, approximately 12 liters, was now added 3 liters of acetone and this solution was filtered and then extracted five times with three liter portions of Skellysolve B hexanes to remove lipids resulting from the fermentation. The thus-obtained mixture was extracted four times with 5-liter volumes of ethylene dichloride. The ethylene dichloride extracts were combined, dried over anhydrous sodium sulfate and evaporated. The thus-produced residue was three times recrystallized from methanol and Skellysolve B hexane to give 3β,11β-dihydroxy-5-androsten-17-one.

PREPARATION 6

*3β,11β-dihydroxy-6-methyl-5-androsten-17-one*

In the same manner as shown in Preparation 5, 3β-hydroxy-6-methyl-5-androsten-17-one is submitted to fermentation with *Cunninghamella blakesleeana* and the fermentation mixture is extracted with water-immiscible organic solvents such as ethylene dichloride, methylene chloride, ether, benzene and the like to give 3β,11β-dihydroxy-6-methyl-5-androsten-17-one which is purified by either recrystallization from methanol, ethanol or mixtures of methanol and ethanol and hydrocarbons such as Skellysolve B hexanes, heptane, or the like.

PREPARATION 7

*3β-mercapto-11β-hydroxy-6-methyl-5-androsten-17-one*

In the same manner given in Preparation 4, 3β,11β-dihydroxy-6-methyl-5-androsten-17-one is converted to the 3β-p-toluenesulfonate which by treatment with thiourea and pyridine produces the 3β-isothiuronium p-toluenesulfonate of 3β,11β-dihydroxy-6-methyl-5-androsten-17-one. Treatment of the isothiuronium toluenesulfonate with sodium hydroxide solution gave the 3β-mercapto-11β-hydroxy-6-methyl-5-androsten-17-one.

In the same manner as shown in Preparation 7, the 3β-mercapto-11β-hydroxy-5-androsten-17-one was prepared.

EXAMPLE 1

*3β-(2-diethylaminoethoxy)-5-androsten-17β-ol hydrochloride*

A solution of 6.0 grams of 3β-(2-diethylaminoethoxy)-5-androsten-17-one hydrochloride in water was made basic with solid sodium bicarbonate and the precipitate taken up in ether-benzene. The free base was obtained as an oily solid upon evaporation of the solvent in vacuo.

The thus-obtained free base, dissolved in 50 milliliters of tetrahydrofuran, was added to a well stirred suspension of 2.0 grams of lithium aluminum hydride in 20 milliliters of tetrahydrofuran. The mixture was heated for 6 hours under reflux, then allowed to cool and the excess reagent destroyed with ethyl acetate. Water and ether were then added. The organic layer was separated, washed several times with water, dried over anhydrous sodium sulfate and evaporated to give a residue. This residue was taken up in ether and the ether solution was thereupon extracted with 0.5 normal aqueous hydrochloric acid. The solution of the aminoether hydrochloride in the aqueous acid was separated and washed with chloroform. The combined chloroform washings were evaporated to give 4.85 grams of crude product which was twice recrystallized from chloroform-ethyl acetate to give an analytical sample of 3β-(2-diethylaminoethoxy)-5-androsten-17β-ol hydrochloride of melting point 258 to 261 degrees.

*Analysis.*—Calcd. for $C_{25}H_{42}ClNO_2$: C, 70.47; H, 10.41; N, 3.29. Found: C, 69.58; H, 10.39; N, 3.31.

EXAMPLE 2

*3β-(2-diethylaminoethoxy)-17α-methyl-5-androsten-17β-ol*

A solution of 4.15 grams of 3β-(2-diethylaminoethoxy)-5-androsten-17-one in 100 milliliters of tetrahydrofuran was added to 40 milliliters of a 3 molar methylmagnesium bromide solution in ether. The resulting solution was heated under reflux for two hours and then allowed to stand at room temperature for 15 hours. The excess reagent was destroyed with water and ether was added. The organic layer was separated, washed well with water and dried with anhydrous magnesium sulfate. The solid which remained when the solvent was distilled was recrystallized twice from aqueous acetone to yield 2.30 grams of 3β-(2-diethylaminoethoxy)-17α-methyl-5-androsten-17β-ol of melting point 118 to 120° C.

*Analysis.*—Calcd. for $C_{26}H_{45}NO_2 \cdot \frac{1}{4}H_2O$: C, 76.51; H, 11.24; N, 3.43. Found: C, 76.37; H, 11.27; N, 3.58.

Further recrystallization from benzene and drying of the crystals in vacuo at 50° C. gave water free material.

EXAMPLE 3

*3β-(2-diethylaminoethoxy)-17α-ethynyl-5-androsten-17β-ol hydrochloride*

Acetylene was allowed to bubble through an ice-cold ether-free solution of methylmagnesium bromide in 100 milliliters of tetrahydrofuran for a period of 45 minutes. To this solution there was added a solution of 3β-(2-diethylaminoethoxy)-5-androsten-17-one in 100 milliliters of tetrahydrofuran. After 15 hours of heating under reflux, the mixture was allowed to cool and the excess reagent destroyed by adding water. Ether was thereupon added and the organic layer washed well with water, followed by 0.5 N hydrochloric acid. The acid wash was then extracted with 600 milliliters of methylene chloride. The methylene chloride solution was evaporated and the resulting solids, 3.70 grams, was recrystallized twice from ethanol-ethyl acetate to yield 2.41 grams of 3β-(2-diethylaminoethoxy)-17α - ethynyl - 5-androsten-17β-ol hydrochloride of melting point 251.5 to 253 degrees.

Some of this sample was recrystallized from ethanol to give a pure analytical sample of melting point 258–260° C. However, the infrared spectrum of this sample showed it to be an ethanol solvate. Analysis for the ethanol solvate is as follows:

*Analysis.*—Calcd. for $C_{27}H_{44}ClNO_2 \cdot C_2H_5OH$: C, 70.21; H, 10.15; N, 2.82. Found: C, 70.26; H, 10.05; N, 3.47.

Treating 3β-(2 - diethylaminoethoxy)-17α-ethynyl-5-androsten-17β-ol hydrochloride in aqueous solution with potassium carbonate yields the free base, 3β-(2-diethylaminoethoxy)-17α-ethynyl-5-androsten-17β-ol which is recovered from the aqueous mixture by extraction with water-immiscible solvents and evaporation of the solvent.

EXAMPLE 4

*3β-(2-diethylaminoethoxy)-5-androsten-17-one N-oxide hydrochloride*

To a solution of 3β-(2-diethylaminoethoxy)-5-androsten-17-one hydrochloride (3.5 grams), dissolved in 20 milliliters of methanol, was added 10 milliliters of a 5 percent solution of sodium hydroxide in methanol. After swirling for 5 minutes the mixture was filtered and the filtrate evaporated to dryness under vacuum. The residue was dissolved in 100 milliliters of methylene dichloride which was then washed with three 25 milliliter portions of water. The methylene dichloride phase was filtered and then evaporated to dryness under vacuum, yielding 2.34 grams of the free base of the starting hydrochloride. This white solid material was dissolved in 10 milliliters of ethanol, cooled in an ice bath and 5 milliliters of 30 percent hydrogen peroxide solution added. After standing at about 25 degrees for 18 hours, the excess hydrogen peroxide was destroyed by portionwise addition of 500 milligrams of platinum oxide catalyst. Filtration and evaporation of the filtrate gave a white solid which was dissolved in ether. Hydrogen chloride gas was bubbled into this solution and the white solid which precipitated was collected, dried and recrystallized twice from acetone to give 3β-(2-diethylaminoethoxy)-5-androsten-17-one N-oxide hydrochloride of melting point 156 to 159.

*Analysis.*—Calcd. for $C_{24}H_{42}ClNO_3$: C, 68.23; H, 9.62; N, 3.18; Cl, 8.06. Found: C, 68.27; H, 9.78; N, 3.27; Cl, 8.16.

EXAMPLE 5

3β-(2-diethylaminoethoxy)-5α-androstan-17-one hydrochloride

3β-(2-diethylaminoethoxy)-5-androsten-17-one hydrochloride (1.1 grams) was dissolved in 200 milliliters of methanol and reduced in a Parr Hydrogenator at 30 to 50 p.s.i. of hydrogen pressure using about 1 gram of 5 percent palladium on carbon as reduction catalyst. After one hour of the theoretical amount of hydrogen had been taken up, the reaction solution was filtered to remove the catalyst and the filtrate evaporated to dryness. The solid residue was recrystallized four times from a mixture of acetone-Skellysolve B hexanes to give 3β-(2-diethylaminoethoxy)-5α-androstan-17-one hydrochloride monohydrate of melting point 164 to 165 degrees, with a yield of 500 milligrams.

*Analysis.*—Calcd. for $C_{25}H_{43}NO_2 \cdot HCl \cdot H_2O$: C, 67.76; H, 10.24; N, 3.16; Cl, 8.00. Found: C, 67.81; H, 10.12; N, 3.29; Cl, 8.17.

Further heating to 60° C. in a vacuum desiccator resulted in the anhydrous material, 3β-(2-diethylaminoethoxy)-5α-androstan-17-one hydrochloride.

EXAMPLE 6

3β-(2-diethylaminoethylthio)-5-androsten-17-one hydrochloride

A mixture of 0.35 mole of 3β-mercapto-5-androsten-17-one, 100 milliliters of ethylene glycol, 1500 milliliters of benzene and 2 grams of p-toluenesulfonic acid were heated and refluxed for five hours. The water produced is removed from the reaction mixture by use of a water trap. The reaction mixture was then cooled to 30 degrees, washed with 200 milliliters of 5 percent potassium bicarbonate solution, dried over anhydrous sodium sulfate and finally 200 milliliters of benzene was distilled from this mixture to complete the drying process. To the dry benzene solution was added 0.37 mole of butyllithium, dissolved in hexane, followed after 15 minutes by the addition of 0.38 mole of diethylaminoethyl chloride. The reaction mixture was heated at reflux temperature for 24 hours, cooled to 25 degrees, diluted with 1 liter of ether and extracted with three 800 milliliter portions of dilute hydrochloric acid (80 milliliters of 37 percent hydrochloric acid diluted to 800 milliliters). The aqueous extract was washed once with 800 milliliters of ether. The organic extracts were combined, dried over anhydrous sodium sulfate and evaporated to give the dry residue of the unreacted material.

The aqueous acidic phase was extracted with three 500-milliliter portions of methylene dichloride and these extracts were combined, dried and evaporated and the residue twice recrystallized from acetone to give, in 33 percent yield, 3β-(2-diethylaminoethylthio)-5-androsten-17-one hydrochloride of melting point 186 to 189 degrees and rotation $[\alpha]_D$ plus 8 degrees.

*Analysis.*—Calcd. for $C_{25}H_{42}ClNOS$: C, 68.22; H, 9.62; N, 3.18; S, 7.29; Cl, 8.06. Found: C, 67.78; H, 9.56; N, 3.23; S, 7.18; Cl, 8.12.

EXAMPLE 7

3β-(2-diethylaminoethylthio)-5-androsten-17-one N-oxide hydrochloride

To a mixture of 0.38 mole of diethylaminoethyl chloride, dissolved in 250 milliliters of ethanol and cooled in an ice-bath, was added 125 milliliters of 30 percent hydrogen peroxide. After standing at about five degrees for 18 hours, the excess hydrogen peroxide was destroyed by the portion-wise addition of platinum oxide catalyst. After filtration, the solvent was evaporated in vacuo to yield crude diethylaminoethyl chloride N-oxide.

This crude diethylaminoethyl chloride N-oxide was added to a benzene solution of the lithium salt of 3β-mercapto-5-androsten-17-one 17-ethylene ketal, prepared as in Example 6. The reaction mixture was heated at reflux for 24 hours, cooled to room temperature, diluted with 1000 milliliters of ether and extracted with three portions of 750 milliliters of hydrochloride acid (one part 37 percent hydrochloric acid and nine parts water). The aqueous extract was washed once with 750 milliliters of ether. The aqueous acidic phase was extracted with three 500-milliliter portions of methylene dichloride, the extracts were combined, dried, evaporated and the thus-obtained residue twice recrystallized from ethanol to give 3β-(2-diethylaminoethylthio)-5-androsten-17-one N-oxide hydrochloride.

In the same manner given in Example 7, the N-oxides of dimethylaminoethyl chloride, diethylaminopropyl chloride, dimethylaminopropyl chloride, diethylaminobutyl chloride, dimethylaminobutyl chloride, diethylaminopentyl chloride, dimethylaminopentyl chloride, diethylaminohexyl chloride, dimethylaminohexyl chloride can be made, which upon reaction with a selected lithium salt of 3β-mercapto-5-androsten-17-one 17-ketal, as shown in Example 7, result in the corresponding 3β-(2-dialkylaminoalkylthio)-5-androsten-17-one N-oxide hydrochloride.

Thus from:

(a) 3β-mercapto-5-androsten-17-one with diethylaminopropyl chloride N-oxide was obtained 3β-(3-diethylaminopropylthio)-5-androsten-17-one N-oxide hydrochloride.

(b) 3β-mercapto-5-androsten-17-one with diethylaminobutyl chloride N-oxide was obtained 3β-(4-diethylaminobutylthio)-5-androsten-17-one N-oxide hydrochloride.

(c) 3β-mercapto-5-androsten-17-one with diethylaminopentyl chloride N-oxide was obtained 3β-(5-diethylaminopentylthio)-5-androsten-17-one N-oxide hydrochloride.

(d) 3β-mercapto-5-androsten-17-one with diethylaminohexyl chloride N-oxide was obtained 3β-(6-diethylaminohexylthio)-5-androsten-17-one N-oxide hydrochloride.

(e) 3β-mercapto-5-androsten-17-one with dimethylaminobutyl chloride N-oxide was obtained 3β-(4-dimethylaminobutylthio)-5-androsten-17-one N-oxide hydrochloride.

(f) 3β-mercapto-5-androsten-17-one with dimethylaminopentyl chloride N-oxide was obtained 3β-(5-dimethylaminopentylthio)-5-androsten-17-one N-oxide hydrochloride.

(g) 3β-mercapto-5-androsten-17-one with dimethylaminohexyl chloride N-oxide was obtained 3β-(6-dimethylaminohexylthio)-5-androsten-17-one N-oxide hydrochloride.

(h) 3β-mercapto-5-androsten-17-one with morpholinylbutyl chloride N-oxide was obtained 3β-(4-morpholinylbutylthio)-5-androsten-17-one N-oxide hydrochloride.

(i) 3β-mercapto-11β-hydroxyl-5-androsten-17-one with diethylaminoethyl chloride N-oxide was obtained 3β-(2-diethylaminoethylthio)-11β-hydroxyl-5-androsten-17-one N-oxide hydrochloride.

(j) 3β-mercapto-11β-hydroxyl-5-androsten-17-one with diethylaminopropyl chloride N-oxide was obtained 3β-(3-diethylaminopropylthio)-11β-hydroxyl-5-androsten-17-one N-oxide hydrochloride.

(k) 3β-mercapto-11β-hydroxyl-5-androsten-17-one with diethylaminobutyl chloride N-oxide was obtained 3β-(4-diethylaminobutylthio)-11β-hydroxy-5-androsten-17-one N-oxide hydrochloride.

(l) 3β-mercapto-11β-hydroxyl-5-androsten-17-one with diethylaminopentyl chloride N-oxide was obtained 3β-(5-diethylaminopentylthio)-11β-hydroxyl-5-androsten-17-one N-oxide hydrochloride.

(m) 3β-mercapto-11β-hydroxyl-5-androsten-17-one with dimethylaminobutyl chloride N-oxide was obtained 3β-(4-dimethylaminobutylthio)-11β-hydroxyl-5-androsten-17-one N-oxide hydrochloride.

(n) 3β-mercapto-11β-hydroxyl-5 - androsten-17-one with dimethylaminohexyl chloride N-oxide was obtained 3β-(6-dimethylaminohexylthio)-11β-hydroxyl-5-androsten-17-one N-oxide hydrochloride.

(o) 3β-mercapto-11β-hydroxyl-5 - androsten-17-one with morpholinylhexyl chloride N-oxide was obtained 3β-(6-morpholinylhexylthio)-11β-hydroxyl - 5 - androsten-17-one N-oxide hydrochloride.

(p) 3β-mercapto-6-methyl - 5 - androsten-17-one with diethylaminoethyl chloride N-oxide was obtained 3β-(3-diethylaminoethylthio)-6-methyl-5-androsten-17-one N-oxide hydrochloride.

(q) 3β-mercapto-6-methyl - 5 - androsten-17-one with diethylaminohexyl chloride N-oxide was obtained 3β-(6-diethylaminohexylthio)-6-methyl - 5 - androsten-17-one N-oxide hydrochloride.

(r) 3β-mercapto-6-methyl-5-androsten-17-one with morpholinylhexyl chloride N-oxide was obtained 3β-(6-morpholinylhexylthio)-6-methyl-5-androsten-17-one N-oxide hydrochloride.

(s) 3β-mercapto-6-methyl-11β - hydroxy-5-androsten-17-one with diethylaminoethyl chloride N-oxide was obtained 3β-(2 - diethylaminoethylthio) - 6 - methyl-11β-hydroxy-5-androsten-17-one N-oxide hydrochloride.

(t) 3β-mercapto-6-methyl-11β - hydroxy-5-androsten-17-one with diethylaminobutyl chloride N-oxide was obtained 3β-(4 - diethylaminobutylthio) - 6 - methyl-11β-hydroxy-5-androsten-17-one N-oxide hydrochloride.

(u) 3β-mercapto-6-methyl-11β-hydroxy-5-androsten - 17-one with diethylaminohexyl chloride N-oxide was obtained 3β-(6 - diethylaminohexylthio) - 6 - methyl-11β-hydroxy-5-androsten-17-one N-oxide hydrochloride.

(v) 3β-mercapto-6-methyl-11β-hydroxy-5-androsten - 17-one with dimethylaminohexyl chloride N-oxide was obtained 3β - (6 - dimethylaminohexylthio)-6-methyl-11β-hydroxy-5-androsten-17-one N-oxide hydrochloride.

(w) 3β-mercapto-6-methyl-11β-hydroxy-5-androsten - 17-one with morpholinylhexyl chloride N-oxide was obtained 3β-(6-morpholinylhexylthio) - 6-methyl-11β-hydroxy-5-androsten-17-one N-oxide hydrochloride.

EXAMPLE 8

*3β-(3-diethylaminopropoxy)-5-androsten-17-one hydrochloride*

In the same manner given in Example 6, but using 3-hydroxy-5-androsten-17-one as starting steroid and diethylaminopropyl chloride as etherification agent, produced in 20 percent yield 3β-(3-diethylaminopropoxy)-5-androsten-17-one hydrochloride of melting point 212 to 213.

*Analysis.*—Calcd. for $C_{26}H_{44}ClNO_2$: C, 71.28; H, 10.13; N, 3.20; Cl, 8.09. Found: C, 70.73; H, 10.03; N, 3.28; Cl, 8.20.

EXAMPLE 9

*3β-(2-dimethylaminoethoxy)-5-androsten-17-one hydrochloride*

In the same manner given in Example 6, 3β-hydroxy-5-androsten-17-one was converted with dimethylaminoethyl chloride to 3β-(2-dimethylaminoethoxy)-5-androsten-17-one of melting point 232 to 234 degrees.

*Analysis.*—Calcd. for $C_{23}H_{38}ClNO_2 \cdot H_2O$: C, 69.62; H, 10.22; N, 3.38; Cl, 8.57. Found: C, 69.47; H, 9.50; N, 3.56; Cl, 8.99.

EXAMPLE 10

*3β-(2-morpholinylethoxy)-5-androsten-17-one hydrochloride*

In the same manner given in Example 6, 3β-hydroxy-5-androsten-17-one was converted with morpholinylethyl chloride to 3β-(2-morpholinylethoxy)-5-androsten-17-one hydrochloride which when recrystallized from ethyl acetate melted at 216 to 218 degrees centigrade with rotation $[\alpha]_D$ of plus 12 degrees in chloroform.

*Analysis.*—Calcd. for $C_{25}H_{40}ClNO_3$: C, 68.54; H, 9.20; N, 3.20; Cl, 8.10. Found: C, 67.91; H, 9.15; N, 3.35; Cl, 8.15.

EXAMPLE 11

*3β-(2-diethylaminoethoxy)-5α-androstan-17-one, N-oxide, hydrochloride*

In the same manner as shown in Example 4, 3β-(2-diethylaminoethoxy)-5α-androstan - 17 - one hydrochloride monohydrate was converted to 3β - (2 - diethylaminoethoxy)-5α-androstan-17-one N-oxide, hydrochloride in 43 percent yield with a melting point of 151 to 153 degrees and rotation $[\alpha]_D$ of plus 47 degrees in chloroform.

*Analysis.*—Calcd. for $C_{25}H_{44}ClNO_3$: C, 67.92; H, 10.03; N, 3.17; Cl, 8.02. Found: C, 67.68; H, 10.16; N, 3.19; Cl, 8.09.

EXAMPLE 12

In the same manner given in Example 6, other 3-aminoethers and 3-thioaminoethers are obtained by converting a selected 3β-hydroxy or 3β-mercapto-5-androsten-17-one to its respective 17-ketal, treating the ketal with an alkali metal metathetically active reagent, e.g., butyl lithium, sodium or potassium hydride, sodium triphenylmethane and the like, and thereupon with a selected N-substituted amino-alkyl chloride. Thus from:

(a) 3β-hydroxy-5-androsten-17-one with diethylaminobutyl chloride was obtained 3β-(4-diethylaminobutoxy)-5-androsten-17-one hydrochloride.

(b) 3β - hydroxy-5-androsten-17-one with diethylaminopentyl chloride was obtained 3β-(5-diethylaminopentoxy)-5-androsten-17-one hydrochloride.

(c) 3β - hydroxy-5-androsten-17-one with diethylaminohexyl chloride was obtained 3β-(6-diethylaminohexyloxy)-5-androsten-17-one hydrochloride.

(d) 3β-hydroxy-5-androsten-17-one with dimethylaminobutyl chloride was obtained 3β-(4-dimethylaminobutoxy)-5-androsten-17-one hydrochloride.

hexyl chloride was obtained 3β-(6-morpholinylhexyloxy)-5-androsten-17-one hydrochloride.

(e) 3β - hydroxy - 5-androsten-17-one with morpholinylbutyl chloride was obtained 3β-(4-morpholinylbutoxy)-5-androsten-17-one hydrochloride.

(f) 3β-hydroxy-5-androsten-17-one with dimethylaminopentyl chloride was obtained 3β-(5-dimethylaminopentoxy)-5-androsten-17-one hydrochloride.

(g) 3β - hydroxy - 5-androsten-17-one with morpholinylpentyl chloride was obtained 3β-(5-morpholinylpentoxy)-5-androsten-17-one hydrochloride.

(h) 3β-hydroxy-5-androsten-17-one with dimethylaminohexyl chloride was obtained 3β-(6-dimethylaminohexyloxy)-5-androsten-17-one hydrochloride.

(i) 3β - hydroxy - 5-androsten-17-one with morpholinyl- (j) 3β - mercapto-5-androsten-17-one with diethylaminopropyl chloride was obtained 3β-(3-diethylaminopropylthio)-5-androsten-17-one hydrochloride.

(k) 3β-mercapto-5-androsten-17-one with diethylaminobutyl chloride was obtained 3β-(4-diethylaminobutylthio)-5-androsten-17-one hydrochloride.

(l) 3β - mercapto-5-androsten-17-one with diethylaminopentyl chloride was obtained 3β-(5-diethylaminopentylthio)-5-androsten-17-one hydrochloride.

(m) 3β-mercapto-5-androsten-17-one with diethylaminohexyl chloride was obtained 3β-(6-diethylaminohexylthio)-5-androsten-17-one hydrochloride.

(n) 3β - mercapto-5-androsten-17-one with dimethylaminobutyl chloride was obtained 3β-(4-dimethylaminobutylthio)-5-androsten-17-one hydrochloride.

(o) 3β - mercapto-5-androsten-17-one with dimethylaminopentyl chloride was obtained 3β-(5-dimethylaminopentylthio)-5-androsten-17-one hydrochloride.

(p) 3β - mercapto-5-androsten-17-one with dimethylaminohexyl chloride was obtained 3β-(6-dimethylaminohexylthio)-5-androsten-17-one hydrochloride.

(q) 3β - mercapto-5-androsten-17-one with morpholinylbutyl chloride was obtained 3β-(4-morpholinylbutylthio)-5-androsten-17-one hydrochloride.
(r) 3β - mercapto-5-androsten-17-one with morpholinylpentyl chloride was obtained 3β-(5-morpholinylpentylthio)-5-androsten-17-one hydrochloride.
(s) 3β - mercapto-5-androsten-17-one with morpholinylhexyl chloride was obtained 3β-(6-morpholinylhexylthio)-5-androsten-17-one hydrochloride.

*Example 13*

In the same manner given in Examples 6 and 7, 11-oxygenated 3-amino ethers and 11-oxygenated 3-aminothioethers are obtained by converting a selected 3β,11β-dihydroxy or 3β-mercapto-11β-hydroxy-5-androsten-17-one to its respective ketal, treating the ketal with butyl lithium and thereupon with a selected N-substituted amino alkyl chloride. Thus from:

(a) 3β,11β - dihydroxy-5-androsten-17-one with diethylaminoethyl chloride was obtained 3β-(2-diethylaminoethoxy) - 11β - hydroxy-5-androsten-17-one hydrochloride.
(b) 3β,11β - dihydroxy-5-androsten-17-one with diethylaminopropyl chloride was obtained 3β-(3-diethylaminopropoxy) - 11β-hydroxy-5-androsten-17-one hydrochloride.
(c) 3β,11β - dihydroxy-5-androsten-17-one with diethylaminobutyl chloride was obtained 3β-(4-diethylaminobutoxy) - 11β - hydroxy-5-androsten-17-one hydrochloride.
(d) 3β,11β - dihydroxy-5-androsten-17-one with diethylaminopentyl chloride was obtained 3β-(5-diethylaminopentoxy) - 11β-hydroxy-5-androsten-17-one hydrochloride.
(e) 3β,11β - dihydroxy-5-androsten-17-one with diethylaminohexyl chloride was obtained 3β-(6-diethylaminohexyloxy)-11β-hydroxy-5-androsten-17-one hydrochloride.
(f) 3β,11β-dihydroxy-5-androsten-17-one with dimethylaminobutyl chloride was obtained 3β-(4-dimethylaminobutoxy)-11β-hydroxy-5-androsten-17-one hydrochloride.
(g) 3β,11β - dihydroxy-5-androsten-17-one with morpholinylbutyl chloride was obtained 3β-(4-morpholinylbutoxy) - 11β - hydroxy-5-androsten-17-one hydrochloride.
(h) 3β,11β-dihydroxy-5-androsten-17-one with dimethylaminopentyl chloride was obtained 3β-(5-dimethylaminopentoxy) - 11β - hydroxy-5-androsten-17-one hydrochloride.
(i) 3β,11β - dihydroxy-5-androsten-17-one with morpholinylpentyl chloride was obtained 3β-(5-morpholinylpentoxy) - 11β-hydroxy-5-androsten-17-one hydrochloride.
(j) 3β,11β-dihydroxy-5-androsten-17-one with dimethylaminohexyl chloride was obtained 3β-(6-dimethylaminohexyloxy) - 11β - hydroxy-5-androsten-17-one hydrochloride.
(k) 3β,11β-dihydroxy-5-androsten-17-one with morpholinylhexylchloride was obtained 3β-(6-morpholinylhexyloxy)-11β-hydroxy-5-androsten-17-one hydrochloride.
(l) 3β-mercapto-11β-hydroxy-5-androsten-17-one with diethylaminoethyl chloride was obtained 3β-(2-diethylaminoethylthio)-11β-hydroxy-5-androsten-17-one hydrochloride.
(m) 3β-mercapto-11β-hydroxy-5-androsten-17-one with diethylaminopropyl chloride was obtained 3β-(3-diethylaminopropylthio)-11β-hydroxy-5-androsten-17-one hydrochloride.
(n) 3β-mercapto-11β-hydroxy-5-androsten-17-one with diethylaminobutyl chloride was obtained 3β- (4-diethylaminobutylthio)-11β-hydroxy-5-androsten-17-one hydrochloride.
(o) 3β-mercapto-11β-hydroxy-5-androsten-17-one with diethylaminopentyl chloride was obtained 3β-(5-diethylaminopentylthio)-11β-hydroxy-5-androsten-17-one hydrochloride.
(p) 3β-mercapto-11β-hydroxy-5-androsten-17-one with diethylaminohexyl chloride was obtained 3β-(6-diethylaminohexylthio)-11β-hydroxy-5-androsten-17-one hydrochloride.
(q) 3β-mercapto-11β-hydroxy-5-androsten-17-one with dimethylaminobutyl chloride was obtained 3β-(4-dimethylaminobutylthio)-11β-hydroxy-5-androsten-17-one hydrochloride.
(r) 3β-mercapto-11β-hydroxy-5-androsten-17-one with dimethylaminopentyl chloride was obtained 3β-(5-dimethylaminopentylthio)-11β-hydroxy 5-androsten-17-one hydrochloride.
(s) 3β-mercapto-11β-hydroxy-5-androsten-17-one with dimethylaminohexyl chloride was obtained 3β-(6-dimethylaminohexylthio)-11β-hydroxy-5-androsten-17-one hydrochloride.
(t) 3β-mercapto-11β-hydroxy-5-androsten-17-one with morpholinylbutyl chloride was obtained 3β-(4-morpholinylbutylthio)-11β-hydroxy-5-androsten-17-one hydrochloride.
(u) 3β-mercapto-11β-hydroxy-5-androsten-17-one with morpholinylpentyl chloride was obtained 3β-(5-morpholinylpentylthio)-11β-hydroxy-5-androsten-17-one hydrochloride.
(v) 3β-mercapto-11β-hydroxy-5-androsten-17-one with morpholinylhexyl chloride was obtained 3β-(6-morpholinylhexylthio)-11β-hydroxy-5-androsten-17-one hydrochloride.

EXAMPLE 14

In the same manner given in Examples 6 and 7, 3-amino-6-methyl ethers and thioethers are obtained by converting selected 3β-hydroxy-6-methyl- or 3β-mercapto-6-methyl - 5 - androsten-17-ones, 3β,11β-dihydroxy-6-methyl- or 3β-mercapto-6-methyl-11β-hydroxy-5-androsten-17-ones to its respective ketals, treating the ketals with butyl lithium and thereupon with a selected N-substituted amino alkyl chloride. Thus from:
(a) 3β-hydroxy-6-methyl-5-androsten-17-one with diethylaminoethyl chloride was obtained 3β-(2-diethylaminoethoxy)-6-methyl-5-androsten-17-one hydrochloride.
(b) 3β-hydroxy-6-methyl-5-androsten-17-one with diethylaminobutyl chloride was obtained 3β-(4-diethylaminobutoxy)-6-methyl-5-androsten-17-one hydrochloride.
(c) 3β-hydroxy-6-methyl-5-androsten-17-one with diethylaminohexyl chloride was obtained 3β-(6-diethylaminohexyloxy)-6-methyl-5-androsten-17-one hydrochloride.
(d) 3β-hydroxy-6-methyl-5-androsten-17-one with dimethylaminobutyl chloride was obtained 3β-(4-dimethylaminobutoxy)-6-methyl-5-androsten-17-one hydrochloride.
(e) 3β-hydroxy-6-methyl-5-androsten-17-one with morpholinylethyl chloride was obtained 3β-(4-morpholinylethoxy)-6-methyl-5-androsten-17-one hydrochloride.
(f) 3β-hydroxy-6-methyl-5-androsten-17-one with dimethylaminohexyl chloride was obtained 3β-(6-dimethylaminohexyloxy)-6-methyl-5-androsten-17-one hydrochloride.
(g) 3β-mercapto-6-methyl-5-androsten-17-one with diethylaminoethyl chloride was obtained 3β-(3-diethylaminoethylthio)-6-methyl-5-androsten-17-one hydrochloride.
(h) 3β-mercapto-6-methyl-5-androsten-17-one with diethylaminobutyl chloride was obtained 3β-(4-diethylaminobutylthio)-6-methyl-5-androsten-17-one hydrochloride.
(i) 3β-mercapto-6-methyl-5-androsten-17-one with diethylaminohexyl chloride was obtained 3β-(6-diethylaminohexylthio)-6-methyl-5-androsten-17-hydrochloride.

(j) 3β-mercapto-6-methyl-5-androsten-17-one with dimethylaminohexyl chloride was obtained 3β-(6-dimethylaminohexylthio)-6-methyl-5-androsten-17-one hydrochloride.

(k) 3β-mercapto-6-methyl-5-androsten-17-one with morpholinylhexyl chloride was obtained 3β-(6-morpholinylhexylthio)-6-methyl-5-androsten-17-one hydrochloride.

(l) 3β,11β-dihydroxy-6-methyl-5-androsten-17-one with diethylaminoethyl chloride was obtained 3β-(4-diethylaminoethyl)-6-methyl-11β-hydroxy-5-androsten-17-one hydrochloride.

(m) 3β,11β-dihydroxy-6-methyl-5-androsten-17-one with diethylaminohexyl chloride was obtained 3β-(6-diethylaminohexyloxy)-6-methyl-11β-hydroxy-androsten-17-one hydrochloride.

(n) 3β,11β-dihydroxy-6-methyl-5-androsten-17-one with dimethylaminobutyl chloride was obtained 3β-(4-dimethylaminobutoxy)-6-methyl-11β-hydroxy-5-androsten-17-one hydrochloride.

(o) 3β,11β-dihydroxy-6-methyl-5-androsten-17-one with dimethylaminohexyl chloride was obtained 3β-(6-dimethylaminohexyloxy)-6-methyl-11β-hydroxy-5-androsten-17-one hydrochloride.

(p) 3β,11β-dihydroxy-6-methyl-5-androsten-17-one with morpholinylhexyl chloride was obtained 3β-(6-morpholinylhexyloxy)-6-methyl-11β-hydroxy-5-androsten-17-one hydrochloride.

(q) 3β-mercapto-6-methyl-11β-hydroxy-5-androsten-17-one with diethylaminoethyl chloride was obtained 3β-(2-diethylaminoethylthio)-6-methyl-11β-hydroxy-5-androsten-17-one hydrochloride.

(r) 3β-mercapto-6-methyl-11β-hydroxy-5-androsten 17-one with diethylaminobutyl chloride was obtained 3β-(4-diethylaminobutylthio)-6-methyl-11β-hydroxy-5-androsten-17-one hydrochloride.

(s) 3β - mercapto-6-methyl-11β-hydroxy-5-androsten-17-one with diethylaminohexyl chloride was obtained 3β-(6 - diethylaminohexylthio) - 6 - methyl-11β-hydroxy-5-androsten-17-one hydrochloride.

(t) 3β - mercapto-6-methyl-11β-hydroxy-5-androsten-17-one with dimethylaminohexyl chloride was obtained 3β - (6 - dimethylaminohexylthio) - 6 - methyl-11β-hydroxy-5-androsten-17-one hydrochloride.

(u) 3β - mercapto-6-methyl-11β - hydroxy-5-androsten-17-one with morpholinylhexyl chloride was obtained 3β-(6 - morpholinylhexylthio) - 6 - methyl-11β-hydroxy-5-androsten-17-one hydrchloride.

The amino ethers and the amino thioethers of Examples 12, 13 and 14 obtained as hydrochlorides can be obtained as free bases by adding to the aqueous solution of the amino ether hydrochloride or the amino thioether hydrochloride a base such as sodium hydroxide, sodium bicarbonate, potassium hydroxide, potassium carbonate and bicarbonate and the like and extracting the aqueous mixture with water-immiscible solvent such as ether, benzene, methylene chloride, hexanes and the like. The thus-obtained solution is further washed with water, then dried and evaporated, giving the amino ether as free base.

EXAMPLE 15

*3β-(2-diethylaminoethylthio)-17α-methyl-5-androsten-17β-ol*

In the same manner given in Example 2, two grams of 3β-(2-diethylaminoethylthio)-5-androsten-17-one in tetrahydrofuran was added to 40 milliliters of a 3 molar methyl magnesium bromide solution in ether. The resulting solution was heated under reflux for two hours and allowed to stand over night for a period of about 20 hours. Thereupon the excess reagent was destroyed with water and the aqueous reaction mixture extracted with ether. The ether solution was washed several times with water, then evaporated and the solids obtained recrystallized from aqueous acetone to yield 3β-(2-diethylaminoethylthio)-17α-methyl-5-androsten-17β-ol.

EXAMPLE 16

*3β-(2-diethylaminoethylthio)-17α-ethynyl-5-androsten-17β-ol hydrochloride*

In the same manner given in Example 3, acetylene was allowed to bubble through an ice-cold ether-free solution of methyl magnesium bromide in tetrahydrofuran. To this solution was then added 3β-(2-diethylaminoethylthio)-5-androsten-17-one in tetrahydrofuran. After heating for 15 hours, the excess reagent was destroyed by the addition of water and the reaction mixture extracted with ether. The ether solutions were washed with water, then with hydrochloric acid and the aqueous acid wash was then extracted with 600 milliliters of methylene chloride. The methylene chloride solution was evaporated and the resulting solids recrystallized from ethanol and ethyl, acetate to yield 3β-(2-diethylaminoethylthio)-17α-ethynyl-5-androsten-17β-ol hydrochloride.

EXAMPLE 17

*3β-(2-diethylaminethoxy)-6,17α-dimethyl-5-androsten-17β-ol*

In the same manner given as in Example 15, from 3β-(2-diethylaminoethoxy)-6-methyl-5-androsten-17-one with methyl magnesium bromide was obtained 3β-(2-diethylaminoethoxy)-6,17α-dimethyl-5-androsten-17β-ol.

EXAMPLE 18

*3β-(2-diethylaminoethoxy)-6,17α-dimethyl-11β,17β-dihydroxy-5-androsten*

In the same manner given in Example 15, 3β-(2-diethylaminoethoxy)-6-methyl-5-androsten-17-one is treated with methyl magnesium iodide to give 3β-(2-diethylaminoethoxy)-6,17α-dimethyl-11β,17β-dihydroxy-5-androsten.

EXAMPLE 19

*3β-(2-diethylaminoethylthio)-6,17α-dimethyl-11β,17β-dihydroxy-5-androsten*

In the same manner given in Example 15, 3β-(2-diethylaminoethylthio)-6-methyl-11β-hydroxy-5-androsten - 17-one gave with methyl magnesium iodide 3β-(2-diethylaminoethylthio) - 6 - 17α-dimethyl-11β,17β-dihydroxy-5-androsten.

EXAMPLE 20

Substituting in Example 15, the starting steroid with 3β-(2 - diethylaminoethylthio) - 6 - methyl-11β-hydroxy - 5-androsten-17-one results in the production of 3β-(2-diethylaminoethylthio)-6-methyl - 17α-ethynyl-11β,17β - dihydroxy-5-androsten.

In the same manner as shown in Example 15, other 17α-methyl steroids can be prepared from the 3-amino and 3-thio amino 17-ketal ethers such as, for example:

3β-(3-diethylaminopropoxy)-17α-methyl-5-androsten-17β-ol;

3β-(4-diethylaminobutyloxy)-17α-methyl-5-androsten-17β-ol;

3β-(6-diethylaminohexyloxy)-17α-methyl-5-androsten-17β-ol;

3β-(2-dimethylaminoethoxy)-17α-methyl-5-androsten-17β-ol;

3β-(4-dimethylaminobutyloxy)-17α-methyl-5-androsten-17β-ol;

3β-(5-dimethylaminopentyloxy)-17α-methyl-5-androsten-17β-ol;

3β-(2-dimethylaminoethoxy)-11β,17β-dihydroxy-17α-methyl-5-androstene;

3β-(3-diethylaminopropoxy)-6,17α-dimethyl-5-androsten-17β-ol;

3β-(4-diethylaminobutyloxy)-6-17α-dimethyl-5-androsten-17β-ol;

3β-(6-diethylaminohexyloxy)-6,17α-dimethyl-5-androsten-17β-ol;

3β-(3-diethylaminopropylthio)-17α-methyl-5-androsten-17β-ol;

3β-(4-diethylaminobutylthio)-17α-methyl-5-androsten-
  17β-ol;
3β-(6-dimethylaminohexylthio)-6,17α-dimethyl-11β,17β-
  dihydroxy-5-androstene;
3β-(4-dimethylaminobutylthio)-6,17α-dimethyl-11β,17β-
  dihydroxy-5-androstene; and the like.

EXAMPLE 21

*3β-(2-diethylaminoethoxy)-17α-methyl-5-androsten-
17β-ol 17-acetate*

A mixture is prepared consisting of 5 milliliters of pyridine, 5 milliliters of acetic anhydride and 1 gram of 3β-(2-diethylaminoethoxy)-17α-methyl - 5 - androsten - 17β - ol. This mixture was allowed to stand at room temperature with occasional shaking for a period of 4 hours. The mixture was thereupon poured into ice-water and allowed to stand over night. The material which had separated from it was collected on filter paper, washed repeatedly with water and then recrystallized from methanol to give 3β-(2-diethylaminoethoxy)-17α-methyl-5-androsten - 17β-ol 17-acetate.

Replacing in Example 21, the acetic anhydride by propionic butyric valeric, hexanoic, heptanoic, benzoic, phenylacetic or phenylpropionic anhydride or by an acid chloride such as β-cyclopentylpropionic, benzyl chloride, lauroyl chloride, results in the production of the corresponding 17-propioninate, butyrate, valerate, exanerate, octynrate, benzorate, phenyl-acetate, phenyl-propionate, β-cyclopendylpropionate, laurate and the like esters of the corresponding 3β-(2-diethylaminoethoxy)-17α-methyl-5-androsten-17β-ol.

In the same manner the acetate, propionates, butyrates, hexanoates, benzoates and other hydrocarbon carboxylic acid esters may be prepared of other 17α-methyl and 17α-ethynyl, 17β-hydroxy-5-androstenes having an ether group such as 2-diethylaminopropoxy, 2-diethylaminobutyloxy, 2-diethylaminoethylthio, 2-diethylaminopropylthio, 2 diethylaminohexylthio and the like.

EXAMPLE 22

*3β-(2-diethylaminopropoxy)-5α-androstan-17-one
hydrochloride monohydrate*

In the same manner given in Example 5, hydrogenating 3β-(2-diethylaminopropoxy)-5-androsten-17 - one hydrochloride in methanol with hydrogen in the presence of a palladium catalyst on a carbon carrier produces the 3β-(2-diethylaminopropoxy)-5α-androstan-17-one hydrochloride.

In the same manner as shown in Example 5, other 3-amino and 3-aminothio ethers of unsaturated steroid, as prepared in the foregoing examples, can be reduced to give the corresponding saturated 3-amino- and 3-thioamino steroid ethers. Representative products such produced include:

3β-(2-diethylaminoethoxy)-11β-hydroxyandrostan-
  17-one hydrochloride;
3β-(2-diethylaminoethoxy)-6-methyl-11β-
  hydroxyandrostan-17-one hydrochloride;
3β-(3-diethylaminopropoxy)-11β-hydroxyandrostan-
  17-one hydrochloride;
3β-(3-diethylaminopropoxy)-6α-methyl-11β-hydroxy-
  androstan-17-one hydrochloride;
3β-(4-diethylaminobutyloxy)-11β-hydroxyandrostan-
  17-one hydrochloride;
3β-(4-diethylaminobutyloxy)-6α-methyl-11β-hydroxy-
  androstan-17-one hydrochloride;
3β-(5-diethylaminopentyloxy)-11β-hydroxyandrostan-
  17-one hydrochloride;
3β-(5-diethylaminopentyloxy)-6α-methyl-11β-hydroxy-
  androstan-17-one hydrochloride;
3β-(6-diethylaminohexyloxy)-11β-hydroxyandrostan-
  17-one hydrochloride;
3β-(6-diethylaminohexyloxy)-6α-methyl-11β-hydroxy-
  androstan-17-one hydrochloride;
3β-(2-dimethylaminoethylthio)-11β-hydroxyandrostan-
  17-one hydrochloride;
3β-(2-diethylaminoethylthio)-11β-hydroxyandrostan-
  17-one hydrochloride;
3β-(3-diethylaminopropylthio)-11β-hydroxyandrostan-
  17-one hydrochloride;
3β-(6-diethylaminohexylthio)-11β-hydroxyandrostan-
  17-one hydrochloride;
3β-(2-morpholinylethylthio)-6α-methyl-11β-hydroxy-
  androstan-17-one hydrochloride;
3β-(5-morpholinylpentylthio)-6α-methyl-11β-hydroxy-
  androstan-17-one hydrochloride;
3β-(3-dimethylaminopropylthio)-6α-methyl-11β,17β-
  dihydroxyandrostane hydrochloride;
3β-(3-dimethylaminopropylthio)-6α,17α-dimethyl-11β,
  17β-dihydroxyandrostane hydrochloride;
3β-(3-dimethylaminopropylthio)-6α-methyl-17α-ethynyl-
  11β,17β-dihydroxyandrostane hydrochloride;
3β-(4-dimethylaminobutyloxy)-6α-methyl-11β,17β-di-
  hydroxyandrostane hydrochloride, 17α-acetate;
3β-(4-dimethylaminobutyloxy)-6α-methyl-11β,17β-di-
  hydroxyandrostane hydrochloride, 17α-phenylacetate;
3β-(4-dimethylaminobutyloxy)-6α-methyl-11β,17β-
  dihydroxyandrostane hydrochloride, 17α-(3-cyclo-
  pentylpropionate) and the like.

EXAMPLE 23

*3β-diethylaminoethoxy-5-androsten-11,17-dione*

A solution was prepared containing 5 milliliters of glacial acetic acid, 200 milligrams of chromic anhydride and ½ milliliter of water. Into this solution at room temperature (22 to 24 degrees centigrade) was introduced 300 milligrams of 3β-(2-diethylaminoethoxy)-11β,17β-dihydroxy-5-androstene. The mixture was allowed to stand at room tempearture for a period of four hours and was thereupon poured into 50 milliliters of ice-water. The ice-water solution was neutralized by the addition of 10 percent sodium bicarbonate solution. The mixture was thereupon extracted with three 25-milliliter portions of chloroform, the chloroform extracts were combined, repeatedly washed with water until neutral, dried over anhydrous sodium sulfate and evaporated. The thus-obtained residue was recrystallized three times from methanol to give 3β-(2-diethylaminoethoxy)-5-androsten-11,17-dione.

EXAMPLE 24

*3β-(2-diethylaminoethoxy)-17α-methyl-5-androsten-
11-one*

In the same manner given in Example 23, 3β-(2-diethylaminoethoxy) - 17α-methyl-11β,17β-dihydroxy-5-androsten was oxidized with chromic anhydride in acetic acid to give 3β-(2-diethylaminoethoxy)-17α-methyl-17β-hydroxy-5-androsten-11-one.

EXAMPLE 25

*3β-(2-dimethylaminoethoxy)-17β-hydroxy-5-androsten-
11-one 17-acetate*

In the same manner given in Example 23, 3β-(2-dimethylaminoethoxy)-11β,17β - dihydroxy - 5 - androsten-17-acetate was oxidized with chromic acid to give 3β-(2-dimethylaminoethoxy) - 17β - hydroxy-5-androsten-11-one 17-acetate.

In the same manner given in Example 23, other 3-amino-11β-hydroxy steroid ethers can be oxidized to give the corresponding 11-keto ethers of the 3-amino steroids. Representative compounds such produced include:

3β-(4-diethylaminobutyloxy)-5-androsten-11,17-dione;
3β-(6-diethylaminohexyloxy)-5-androsten-11,17-dione;
3β-(2-diethylaminoethoxy)-6-methyl-5-androsten-11,17-
  dione;
3β-(3-diethylaminopropoxy)-6-methyl-5-androsten-
  11,17-dione;

3β-(2-dimethylaminoethoxy)-6,17α-dimethyl-17β-
hydroxy-5-androsten-11-one;
3β-(3-dimethylaminopropoxy)-6,17α-dimethyl-17β-
hydroxy-5-androsten-11-one;
3β-(4-dimethylaminobutoxy)-6,17α-dimethyl-17β-
hydroxy-5-androsten-11-one;
3β-(2-morpholinylethoxy)-6-methyl-17α-ethynyl-17β-
hydroxy-5-androsten-11-one;
3β-(2-diethylaminoethoxy)-6-methyl-17β-hydroxy-5-
androstan-11-one 17-propionate;
3β-(3-diethylaminopropoxy)-6-methyl-17β-hydroxy-5-
androstan-11-one 17-benzoate;
3β-(4-diethylaminobutyloxy)-6-methyl-17β-hydroxy-5-
androstan-11-one 17-acetate;
3β-(6-diethylaminohexyloxy)-6-methyl-17β-hydroxy-5-
androstan-11-one 17-butyrate.

EXAMPLE 26

*3β-(2-diethylaminoethylsulfinyl)-5-androsten-17-one
N-oxide hydrochloride*

In the same manner given in Example 4, a solution of 3β-(2-diethylaminoethylthio)-5-androsten-17-one hydrochloride, dissolved in methanol, was treated with sodium hydroxide to give the free base. The thus-obtained free base 3β-(2-diethylaminoethylthio)-5-androsten-17-one was recovered from the reaction mixture by filtration and evaporation of the filtrate. The residue thus-obtained was purified by recrystallization from methylene dichloride. After purification, the residue was dissolved in ethanol, the ethanol solution cooled in an ice bath and treated with a solution of 30 percent hydrogen peroxide. After standing at about 25° for 18 hours, the excess hydrogen peroxide was destroyed by adding platinum oxide catalyst. Filtration and evaporation of the filtrate gave a white, solid precipitate which was redissolved in ether and precipitated from the ether solution by letting hydrogen chloride gas bubble through it. The thus-obtained material was recrystallized from acetone to give 3β(2-diethylaminoethylsulfinyl)-5-androsten-17-one N-oxide hydrochloride.

In the same manner as shown in Example 4, other N-oxide hydrochlorides of 3-amino steroid ethers are prepared by reacting the free amino base with hydrogen peroxide and recovering the N-oxides as hydrochlorides. Representative compounds thus-obtained include:

3β-(3-diethylaminopropoxy)-5-androsten-17-one N-oxide hydrochloride;
3β-(4-diethylaminobutyloxy)-5-androsten-17-one-N-oxide hydrochloride;
3β-(6-diethylaminohexyloxy)-5-androsten-17-one N-oxide hydrochloride;
3β-(3-diethylaminopropylsulfinyl)-5-androsten-17-one N-oxide hydrochloride;
3β-(4-diethylaminobutylsulfinyl)-5-androsten-17-one N-oxide hydrochloride;
3β-(6-diethylaminohexylthio)-5-androsten-17-one N-oxide hydrochloride;
3β-(3-diethylaminopropoxy)-6-methyl-5-androsten-17-one N-oxide hydrochloride;
3β-(4-diethylaminobutyloxy)-6-methyl-5-androsten-17-one N-oxide hydrochloride;
3β-(6-diethylaminohexyloxy)-6-methyl-5-androsten-17-one N-oxide hydrochloride;
3β-(3-diethylaminopropylsulfinyl)-6-methyl-5-androsten-17-one N-oxide hydrochloride;
3β-(4-diethylaminobutylsulfinyl)-6-methyl-5-androsten-17-one N-oxide hydrochloride;
3β-(6-diethylaminohexylsulfinyl)-6-methyl-5-androsten-17-one N-oxide hydrochloride;
3β-(2-diethylaminopropoxy)-6-methyl-11β-hydroxy-5-androsten-17-one N-oxide hydrochloride;
3β-(4-diethylaminobutyloxy)-6-methyl-11β-hydroxy-5-androsten-17-one N-oxide hydrochloride;
3β-(6-diethylaminohexyloxy)-6-methyl-11β-hydroxy-5-androsten-17-one N-oxide hydrochloride;
3β-(3-diethylaminopropylsulfinyl)-6-methyl-11β-hydroxy-5-androsten-17-one N-oxide hydrochloride;
3β-(4-diethylaminobutylsulfinyl)-6-methyl-11β-hydroxy-5-androsten-17-one N-oxide hydrochloride;
3β-(6-diethylaminohexylsulfinyl)-6-methyl-11β-hydroxy-5-androsten-17-one N-oxide hydrochloride;
3β-(2-dimethylaminoethoxy)-11β,17β-dihydroxy-17α-methyl-5-androsten N-oxide hydrochloride;
3β-(2-dimethylaminoethylsulfinyl)-11β,17β-dihydroxy-17α-methyl-5-androsten-N-oxide hydrochloride;
3β-(4-dimethylaminobutyloxy)-11β,17β-dihydroxy-17α-methyl-5-androsten N-oxide hydrochloride;
3β-(6-dimethylaminohexyloxy)-11β,17β-dihydroxy-17α-methyl-5-androsten N-oxide hydrochloride;
3β-(6-dimethylaminohexylsulfinyl)-11β,17β-dihydroxy-17α-methyl-5-androsten N-oxide hydrochloride;
3β-(2-dimethylaminoethoxy)-11β,17β-dihydroxy-17α-ethynyl-5-androsten N-oxide hydrochloride;
3β-(2-dimethylaminoethylsulfinyl)-11β,17β-dihydroxy-17α-ethynyl-5-androsten N-oxide hydrochloride;
3β-(4-dimethylaminobutyloxy)-11β,17β-dihydroxy-17α-ethynyl-5-androsten N-oxide hydrochloride;
3β-(6-dimethylaminohexyloxy)-11β,17β-dihydroxy-17α-ethynyl-5-androsten N-oxide hydrochloride;
3β-(6-dimethylaminohexylsulfinyl)-11β,17β-dihydroxy-17α-ethynyl-5-androsten N-oxide hydrochloride;
3β-(2-dimethylaminoethoxy)-6,17α-dimethyl-11β,17β-dihydroxy-5-androsten N-oxide hydrochloride;
3β-(2-dimethylaminoethylsulfinyl)-6,17α-dimethyl-11β,17β-dihydroxy-5-androsten N-oxide hydrochloride;
3β-(4-dimethylaminobutyloxy)-6,17α-dimethyl-11β,17β-dihydroxy-5-androsten N-oxide hydrochloride;
3β-(6-dimethylaminohexyloxy)-6,17α-dimethyl-11β,17β-dihydroxy-5-androsten N-oxide hydrochloride;
3β-(6-dimethylaminohexylsulfinyl)-6,17α-dimethyl-11β,17β-dihydroxy-5-androsten N-oxide hydrochloride
3β-(2-morpholinoethoxy)-11β,17β-dihydroxy-17α-methyl-5α-androstan N-oxide hydrochloride;
3β-(3-morpholinopropoxy)-11β,17β-dihydroxy-17α-methyl-5α-androstan N-oxide hydrochloride;
3β-(2-morpholinoethylsulfinyl)-11β,17β-dihydroxy-17α-methyl-5α-androstan N-oxide hydrochloride;
3β-(6-morpholinohexyloxy)-11β,17β-dihydroxy-17α-methyl-5α-androstan N-oxide hydrochloride;
3β-(6-morpholinohexylsulfinyl)-11β,17β-dihydroxy-17α-methyl-5α-androstan N-oxide hydrochloride;
3β-(2-diethyloxyaminoethoxy)-5-androstene-11,17-dione N-oxide hydrochloride;
3β-(2-diethyloxyaminoethylsulfinyl)-5-androstene-11,17-dione N-oxide hydrochloride;
3β-(4-diethyloxyaminobutyloxy)-5-androstene-11,17-dione N-oxide hydrochloride;
3β-(4-diethyloxyaminobutylsulfinyl)-5-androstene-11,17-dione N-oxide hydrochloride;
3β-(2-diethyloxyaminoethoxy)-6-methyl-5-androstene-11,17-dione N-oxide hydrochloride;
3β-(2-diethyloxyaminoethylsulfinyl)-6-methyl-5-androstene-11,17-dione N-oxide hydrochloride;
3β-(4-diethyloxyaminobutyloxy)-6-methyl-5-androstene-11,17-dione N-oxide hydrochloride;
3β-(4-diethyloxyaminobutylsulfinyl)-6-methyl-5-androstene-11,17-dione N-oxide hydrochloride;
3β-(2-dimethylaminoethoxy)-17β-hydroxy-5-androsten-11-one N-oxide 17-acetate hydrochloride;
3β-(2-dimethylaminoethylsulfinyl)-17β-hydroxy-5-androsten-11-one N-oxide 17-acetate hydrochloride;
3β-(6-dimethylaminohexyloxy)-17β-hydroxy-5-androsten-11-one N-oxide 17-acetate hydrochloride;
3β-(2-dimethylaminoethoxy)-6-methyl-17β-hydroxy-5-androsten-11-one N-oxide 17-acetate hydrochloride;
3β-(2-dimethylaminoethylsulfinyl)-6-methyl-17β-hydroxy-5-androsten-11-one N-oxide 17-acetate hydrochloride;
3β-(6-dimethylaminohexyloxy)-6-methyl-17β-hydroxy-5-androsten-11-one N-oxide 17-acetate hydrochloride and the like.

EXAMPLE 27

*3β-(2-diethylaminoethoxy)-17α-methyl-5-androsten 17β-ol sulfate*

A solution of 0.5 gram of 3β-(2-diethylaminoethoxy)-17α-methyl-5-androsten-17β-ol (Example 2) in 10 milliliters of acetone was titrated with a 10 percent sulfuric acid solution in water. Titration was stopped at a pH of about 6.5 and the solution was evaporated. The product was washed with ether and Skellysolve B hexane, the washing discarded and the material twice recrystallized from alcohol to give 3β-(2-diethylaminoethoxy)-17α-methyl-5-androsten-17β-ol sulfate.

In the same manner, other mineral acid salts can be prepared from the 3-amino ethers and 3-aminothio ethers in the free-base state by reacting the selected amino steroid with the stoichiometric quantity of a mineral acid, e.g., hydrobromic, nitric, phosphoric or the like.

We claim:
1. A compound selected from the group consisting of (1) those having the formulae

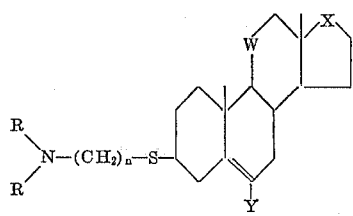

and

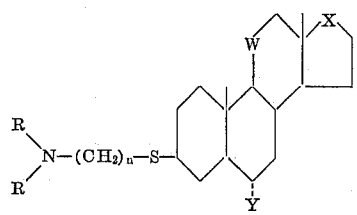

wherein $n$ has a value of 2 to 6, inclusive;

is selected from the group consisting of

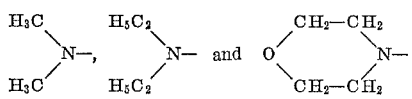

W is selected from the group consisting of

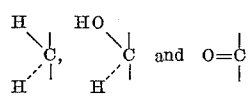

X is selected from the group consisting of

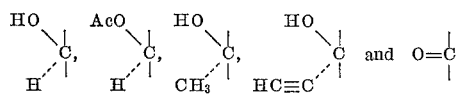

wherein Ac is the acyl radical of a hydrocarbon carboxylic acid containing from one to eight carbon atoms, inclusive; Y is selected from the group consisting of hydrogen and methyl, and (2) a mineral acid salt thereof.

2. A compound selected from the group consisting of (1) those having the formula

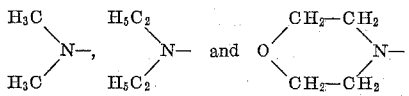

wherein $n$ has a value of 2 to 6, inclusive;

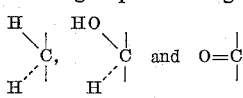

is selected from the group consisting of

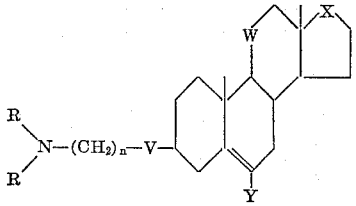

W is selected from the group consisting of

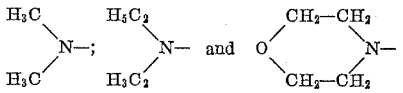

Y is selected from the group consisting of hydrogen and methyl, and (2) a mineral acid salt thereof.

3. 3β - (2-diethylaminoethoxy)-17α-ethyl-5-androsten-17β-ol-hydrochloride.

4. 3β - (2-diethylaminoethylthio)-5-androsten-17-one hydrochloride.

5. 3β - (2-diethylaminoethoxy)-6-methyl-17α-ethynyl-5-androsten-17β-ol hydrochloride.

6. 3β - (4 - diethylaminobutoxy)-17α-ethyl-5-androsten-17β-ol hydrochloride.

7. In a process for the production of steroid compounds selected from the group consisting of compounds of Formula I:

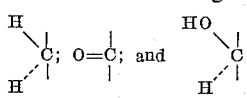 (I)

wherein $n$ has a value of 2 to 6, inclusive;
wherein

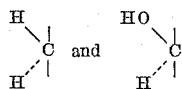

is selected from the group consisting of

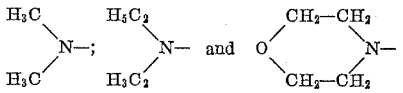

wherein V is selected from the group consisting of the elements oxygen and sulfur;
wherein W is selected from the group consisting of $$\begin{array}{c} H \\ \diagdown \\ C; \\ \diagup \\ H \end{array} \quad O=C; \quad \text{and} \quad \begin{array}{c} HO \\ \diagdown \\ C \\ \diagup \\ H \end{array}$$

when V is oxygen; and
wherein W is selected from $$\begin{array}{c} H \\ \diagdown \\ C \\ \diagup \\ H \end{array} \quad \text{and} \quad \begin{array}{c} HO \\ \diagdown \\ C \\ \diagup \\ H \end{array}$$

when V is sulfur;
wherein X is selected from the group consisting of

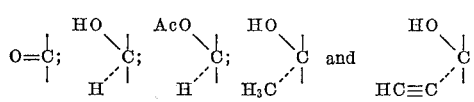

when W is

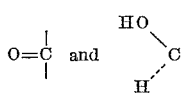

and when V is oxygen; and when W is

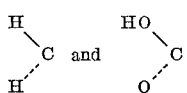

and when V is sulfur; and
wherein X is selected from the groups consisting of

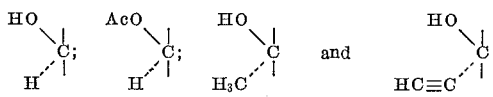

when W is

and when V is oxygen;
wherein Y is selected from the group consisting of methyl and hydrogen; and
wherein Ac is the acyl radical of a hydrocarbon carboxylic acid containing from one to eight carbon atoms, inclusive;
and, the N-oxides and the mineral acid salts thereof selected from the group of mineral acids consiting of hydrochloric, hydrobromic, sulfuric, nitric and phosphoric acid, the steps which comprise: treating a compound of the structure II

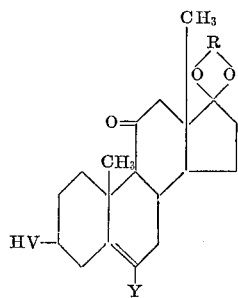

(II)

wherein R is an alkylene group with up to eight carbon atoms and wherein the carbon atoms attached to the oxygen bonds are separated by not more than one methylene group and V and Y have the same significance as in the Formula I, consecutively (1) with an alkali metal metathetically acting agent and (2) with an alkyl chloride selected from the group consisting of compounds of the formula:

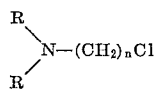

and

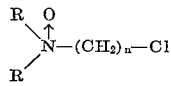

wherein the parameters

and n are defined as above.

No references cited.

LEWIS GOTTS, *Primary Examiner.*

LESLIE H. GASTON, MORRIS LIEBMAN,
*Examiners.*